INVENTORS
Walter G. Harrison
Leo A. Gary
Allan C. Auget
by McDougall, Hersh & Scott
Att'ys

United States Patent Office 3,333,677
Patented Aug. 1, 1967

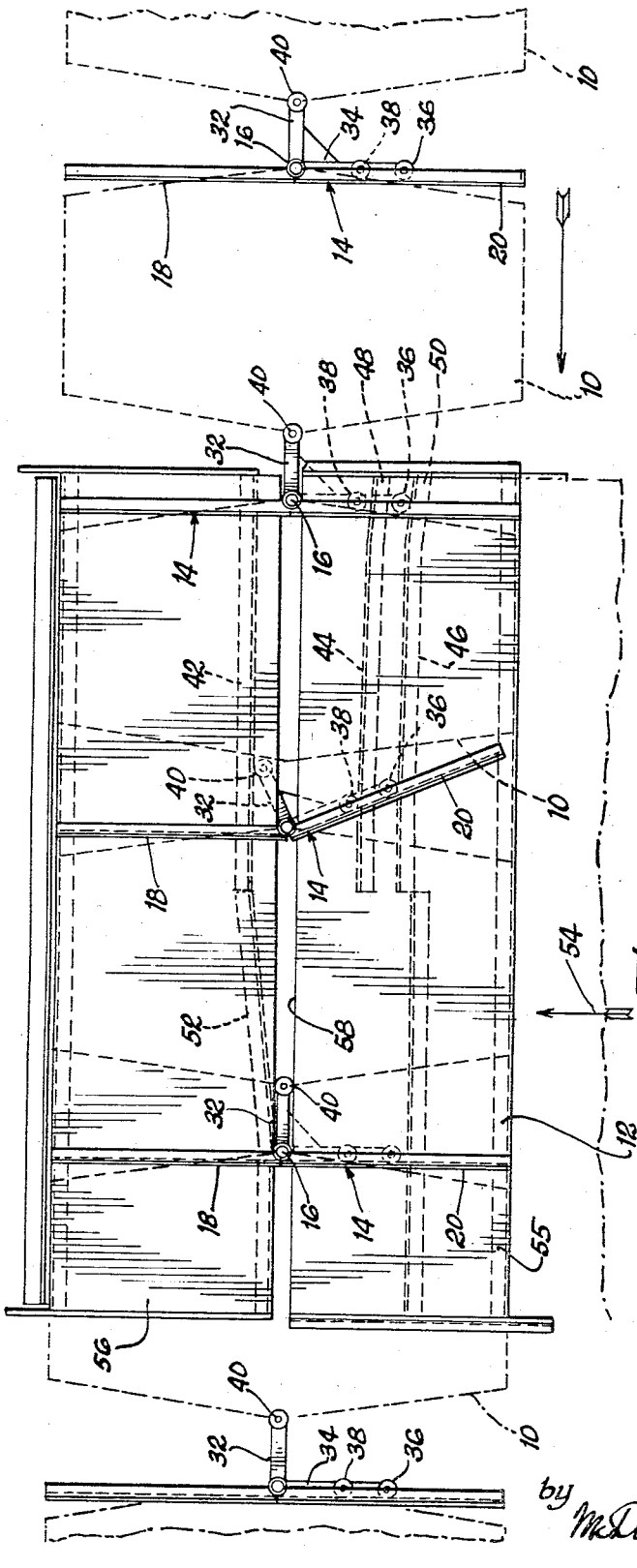

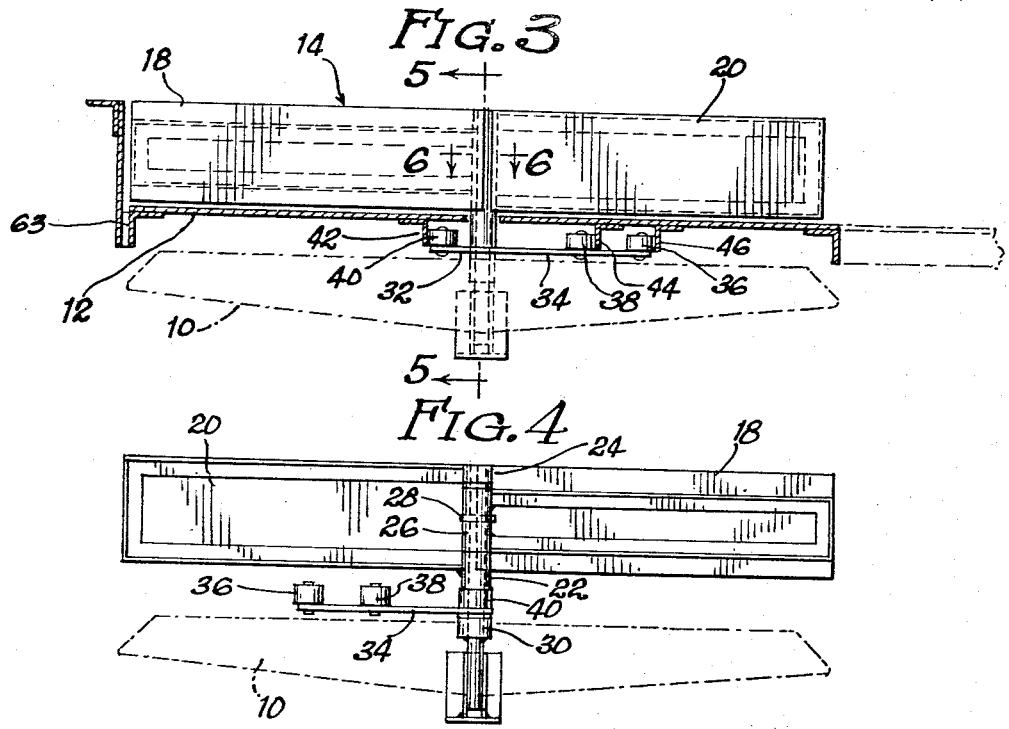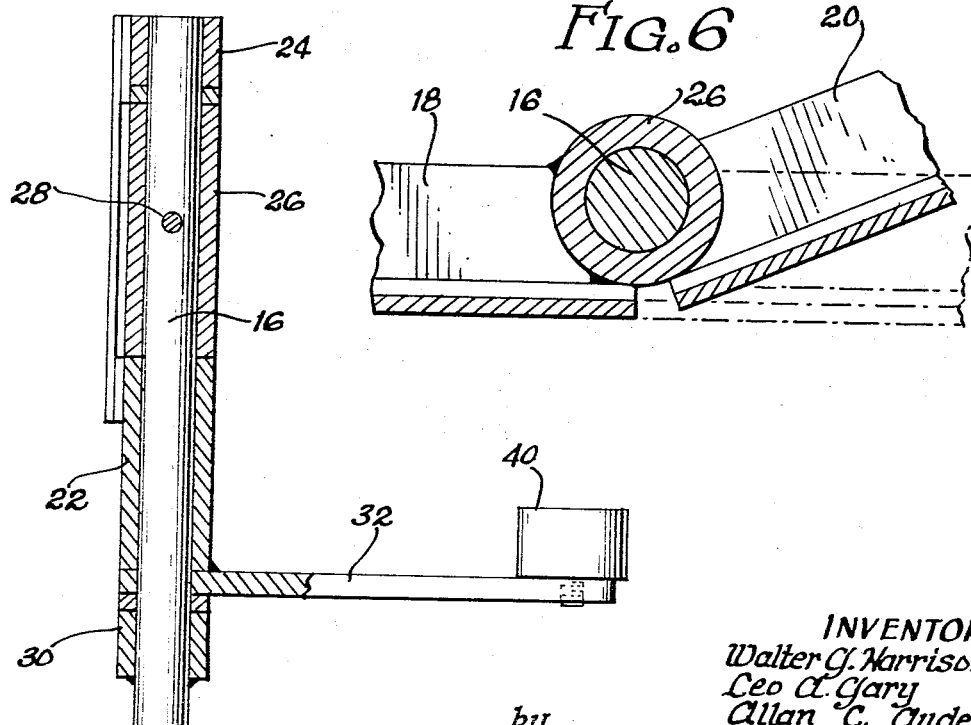

3,333,677
TRANSFER MEANS FOR CONVEYOR CONSTRUCTION
Walter G. Harrison, Westchester, Leo A. Gary, Chicago, and Allan C. Audet, Arlington Heights, Ill., assignors to The Spra-Con Company, Chicago, Ill., a corporation of Illinois
Filed July 8, 1965, Ser. No. 470,522
14 Claims. (Cl. 198—129)

This invention relates to constructions designed to be used in conjunction with a conveyor for placing articles onto the conveyor. In particular, the invention is concerned with transfer means for articles which improve the operation of the construction from the standpoint of loading speed capabilities.

The development of conveyor constructions which include automatic article discharging systems is well known. Such systems usually include endless conveyors which move adjacent to a plurality of discharge stations. Articles are placed on a conveyor at a loading station and suitable coding means are provided whereby the articles will be discharged automatically when they arrive at a selected one of the discharge locations. An example of a system of this nature is set forth in Speaker Patent No. 3,034,665.

Specific constructions of the type disclosed in the aforementioned patent include individual trays which carry the articles to be discharged at the various locations. When an article is placed on a tray, a code is assigned to the article and the tray is adapted to automatically tilt to discharge the article in accordance with the pre-assigned code. Other systems also include individual article carrying mechanisms comparable to trays which have discharge capabilities.

Certain problems arise with regard to placing of articles onto the individual trays. It is undersirable to provide for manual location of articles due to the general lack of efficiency, particularly from the standpoint of accuracy and speed of operation. Mechanical means which are employed for locating articles are often unduly complicated and expensive, and in addition, existing mechanical devices are often characterized by operations which tend to damage more fragile articles. Thus, in certain instances, articles are actually thrown by mechanical devices onto a conveyor tray, and this is generally considered undesirable, for example in the handling of fragile parcels.

In applicants' copending application Ser. No. 449,203, filed Apr. 19, 1965, there is described a feeding means for conveyors. This feeding means generally comprises a table upon which articles to be located on the conveyor can be placed. A plurality of pusher means are adapted to move across the surface of the table for engaging the articles and for moving them to a discharge end of the table where they can then pass to the conveyor. The movement of the pusher means and the movement of the conveyor are synchronized whereby the articles will be discharged at proper times, for example where the conveyor is made up of a plurality of individual spaced apart trays.

In a construction of the type described in the aforementioned application, the pusher means are spaced apart whereby an individual placing articles on the table must locate the articles between adjacent pusher means. The distance between the pusher means determines the size of the "target" which the operator has when putting an article in position. It will be appreciated that the size of this target determines the speed at which the conveyor operation can be undertaken. Thus, with a given spacing between pushers, the speed of the conveyor will be limited to a specific speed since the average operator will only be able to consistently hit the target below this speed limit. Obviously, if the spacing between pushers is increased, the speed of the conveyor can be correspondingly increased.

The nature of the pusher mechanisms employed is such that the spacing between pushers is governed by the spacing between individual portions of the conveyor. Thus, if the conveyor comprises a plurality of spaced apart trays, the pushers will be spaced apart the same distance as the spacing between common points of adjacent trays. Since it is desirable to provide the trays in closely spaced relationship for economy purposes and to provide compactness, it would not be satisfactory to increase the spacing between pushers by increasing the spacing between trays. Furthermore, nothing is gained by such an arrangement since the number of trays passing a given point per unit of time would remain substantially the same with such an arrangement.

It is an object of this invention to provide an improved construction for transferring articles to conveyors whereby the conveyor loading operation can be undertaken with maximum speed and efficiency.

It is an additional object of this invention to provide an improved means for automatically discharging articles onto conveyor trays from a table by means of pushers.

It is a still further object of this invention to provide pusher and table means of the type referred to which include unique structural characteristics whereby the speed and efficiency of transfer of articles to a conveyor can be substantially increased.

These and other objects of this invention will appear hereinafter and for purposes of illustration but not of limitation, specific embodiments of this invention are shown in the accompanying drawings in which:

FIGURE 1 is a plan view illustrating a table and pusher means adapted to be employed for achieving the results of this invention;

FIGURE 2 is a side elevation of the construction shown in FIGURE 1;

FIGURE 3 is a front elevation of the construction shown in FIGURE 1;

FIGURE 4 is a rear elevation of the construction shown in FIGURE 1;

FIGURE 5 is a fragmentary detail view, partly cut away, illustrating the hinge portion of the pusher mechanism;

FIGURE 6 is a fragmentary cross-sectional view of the hinge portion;

Figure 7:
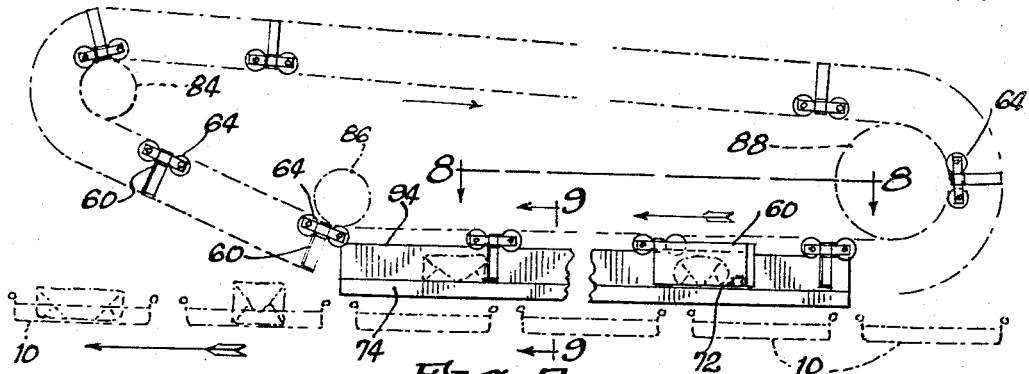
FIGURE 7 is a side elevational view illustrating an alternative form of the invention.

The construction of this invention generally comprises a table which is situated in a stationary position above the path of movement of a conveyor. Pusher means are provided for moving across the table whereby articles placed on the table can be discharged onto the conveyor. The pusher means may be directly associated with the conveyor trays or they may be mounted on an independent support having its movement coordinated with the movement of the conveyor trays.

One aspect of this invention concerns improved structures for the pusher means. The structure disclosed in copending application Ser. No. 449,203 provided pusher means mounted on an endless support movable over the table. This invention provides a novel method for mounting of the pusher means on such an endless support while an alternative form of the invention provides for association of the pusher means directly with each conveyor section.

A second aspect of this invention relates to improved pusher means. These pusher means employ movable sections which are adapted to increase the opening between adjacent pushers at the time of loading of articles onto the table. By providing such an increased opening, the target which the individual handling the articles must hit can be substantially larger whereby a proportionally greater speed can be accommodated in the conveyor operation.

In the drawings, there are illustrated schematically conveyor trays 10 which are adapted to be utilized in combination with the construction of this invention. These conveyor trays may be mounted in the manner described in Harrison et al. Patent No. 3,167,192. The aforementioned Speaker patent also provides a suitable conveyor construction; however, it will be understood that the various aspects of this invention are applicable to a wide variety of conveyor constructions.

FIGURES 1 through 6 illustrate one form of the invention which provides for the use of a table 12 mounted above the path of movement of the conveyor trays 10. A plurality of pushers 14 are associated with each of the conveyor trays. These pushers are held in position by means of posts 16 attached at the rear end of the conveyor trays.

Each of the pushers comprises a fixed section 18 and a movable section 20. As best shown in FIGURES 5 and 6, the sections 20 are provided with hinge members 22 and 24. The sections 18 are provided with a hinge member 26, and it will be appreciated that the members 22, 24 and 26 can be placed in alignment and then positioned on a post 16. A set screw or the like can be provided at 28 for fixing the member 18 in position. A stop member 30 is attached to each post 16 whereby the pusher members will be in proper spaced-apart relationship with respect to the trays 10.

The cylindrical member 22 has attached thereto an outwardly extending arm 32. A second arm 34 extends outwardly at right angles from the arm 32. A pair of rollers 36 and 38 are attached to the arm 34 while a single roller 40 is attached to the arm 32.

The table 12 is provided with tracks which are formed by means of angle members 42, 44 and 46. These tracks are located on the underside of the table, and the arms 32 and 34 are positioned on the post 16 whereby the rollers will engage the tracks when the respective trays pass beneath the table. As best shown in FIGURE 1, the track 42 is displaced from the normal path of movement of the roller 40. The leading ends 48 and 50 of the tracks 44 and 46 are in the direct path of movement of the rollers 38 and 36, respectively. Accordingly, these rollers engage the tracks when the trailing edge of a conveyor tray 10 passes beneath the table 12.

The tracks 44 and 46 are formed at an angle with respect to the path of movement of the trays, and these tracks act through the rollers 38 and 36 to pivot the movable pusher member 20. An extension 52 of the track 42 acts on the roller 40 to restore the member 20 to its normal position.

The normal distance between the adjacent pushers is the distance between the trailing edges of adjacent trays. When an article is being transferred to the table 12 in the direction shown by the arrow 54 of FIGURE 1, then there would ordinarily be an opening corresponding to this distance. The advantages of the described aspect of this invention are illustrated when considering FIGURE 1 since it will be apparent that a substantially wider opening is provided when the member 20 of the pusher is pivoted to the position shown. Where conveyor trays are spaced at 36-inch intervals, an additional opening of eight inches comprises a better than 20 percent increase whereby a corresponding increase in speed of the conveyors is permitted without sacrificing any consistency in performance.

In the construction shown in FIGURES 1 through 6, the table 12 is divided into two sections 55 and 56. An intermediate opening 58 is defined between these two table sections, and this provides freedom for movement of the supporting structure for the pushers from one end of the table to the other. As shown in FIGURE 2, the articles 59 disposed on the table will be discharged onto a tray by the pusher for that tray. The table can be supported in any desired fashion as by means of supports 61 and 63 which are associated with any desirable surrounding framework.

With respect to the construction of FIGURE 1, it will be noted that the pusher members could be attached adjacent a rear corner of a tray with a post extending upwardly from such corner and with the pusher being suspended in cantilever fashion over the tray and table surfaces. Pivoting of the pusher may involve pivoting of a single portion of the pusher or it may comprise pivoting of the entire pusher as will be more fully understood when considering the following alternative system.

Figure 8:
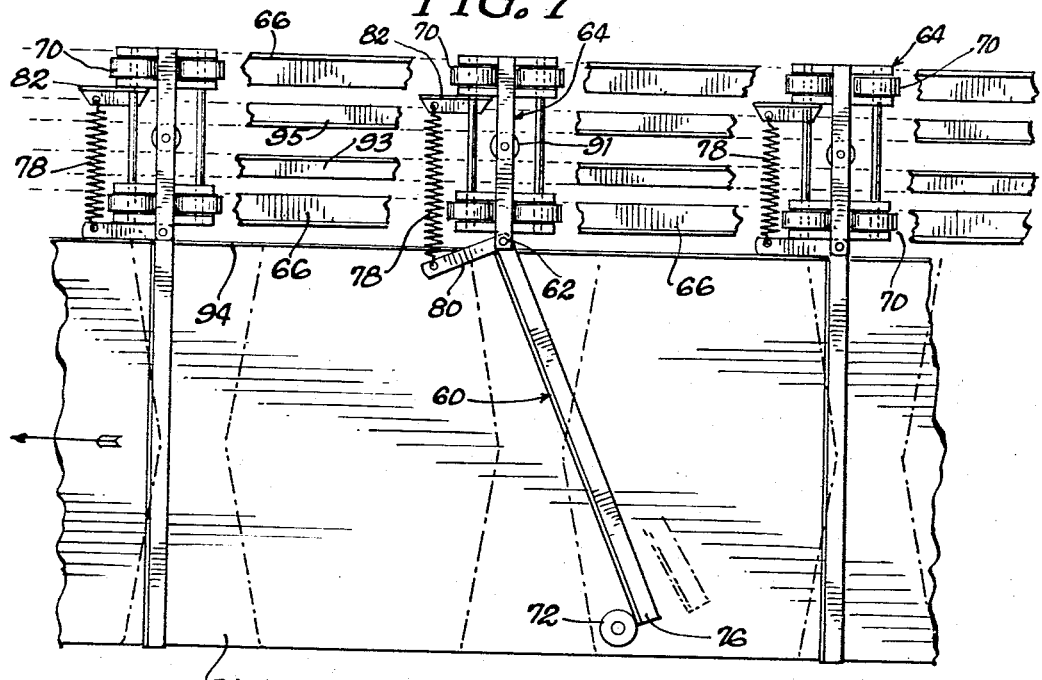
FIGURE 8 is an enlarged plan view taken about the line 8—8 of FIGURE 7.
Figure 9:
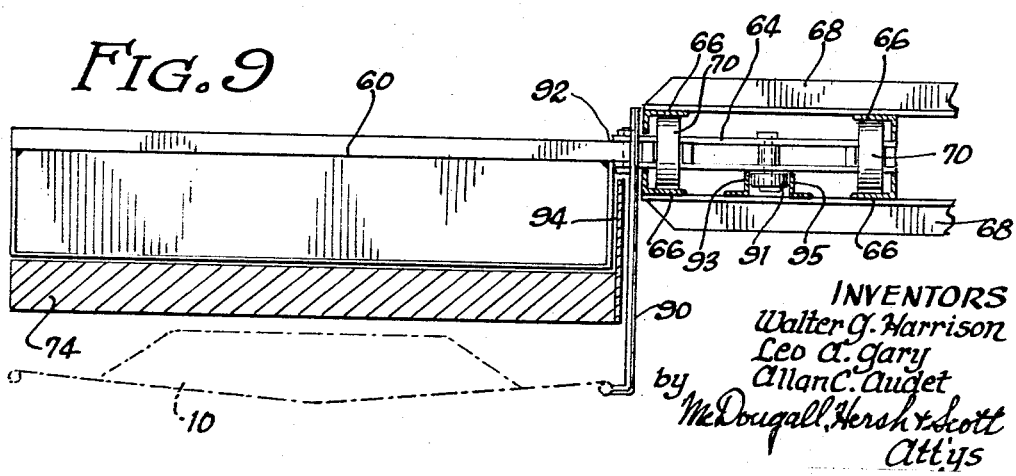
FIGURE 9 is an enlarged cross-sectional view taken about the line 9—9 of FIGURE 7.

In the construction shown in FIGURES 7, 8 and 9, the pusher members are mounted on an endless drive means. Thus, each pusher member 60 is pivotally attached at 62 to a carriage member 64. This carriage member rides in tracks 66 which are supported by means of frame members 68.

The carriage members 64 each support a plurality of wheels 70. The wheels 70 ride on the tracks 66, and it will be appreciated that the four-point contact provided by the wheels 70 lends substantial stability to the construction. Thus, the solid arrangement illustrated substantially maintains the pushers in a level plane whereby the best results of the invention can be achieved.

A roller such as shown at 72 in FIGURE 8 may be attached to the upper side of the table 74. This roller is adapted to engage the end 76 of the pusher 60 each time a pusher passes beneath the table. The action of the roller 72 causes the pusher to be pivoted in opposition to the action of the spring 78. This spring is tied at one end to an arm 80 of the pusher while the other end of the spring is attached to a bracket 82 carried by the carriage 64. It will be appreciated that when the pusher 60 passes beyond the roller 72, the spring 78 will bring the pusher back to its normal position.

The system shown in FIGURES 7, 8 and 9 provides for an increase in the opening between a pair of adjacent pushers whereby substantially the same results which are achieved with respect to the previously described construction can be accomplished. The movement of the end 76 of the pusher comprises the critical consideration since the position of this end determines the extent of the opening provided for an individual loading articles onto the table. It is not particularly important whether the entire pusher is bent or whether a portion of the pusher is bent.

The rails 66 which form the tracks extend in a path as illustrated in FIGURE 7. The carriages 64 can be connected by means of an endless chain which extends over sprocket wheels 84, 86 and 88. An intermediate guide roller 91 is associated with each carriage, and rails 93 and 95 provide a guide track for the intermediate rollers. The chain can advantageously be connected between these intermediate rollers.

It will be appreciated that the carriages 64 could be driven in synchronization with the conveyor through the use of independent drive means. It is preferred, however, to provide an interconnection between the conveyor trays and the carriages whereby synchronization of the pushers and trays will be automatic. This can be accomplished in a fashion similar to that disclosed in copending application Ser. No. 449,203. As shown in FIGURE 9, a pin 90 can be attached to a tray 10, and the pin can be located for engagement with the end 92 of the carriage 64. As each tray comes into the vicinity of the table 12, the pin of the tray will engage a carriage whereby a pusher will be automatically carried along with the tray for proper discharge at the end of the table.

The roller 72 may be directly mounted on the table 74 whereby pivoting action of the pusher 60 will be accomplished at exactly the right moment. A backstop 94 is associated with the table whereby articles placed on the table will be prevented from falling off the opposite side.

It will be appreciated that various modifications could be employed with respect to the disclosed constructions. It will be noted that the pushers could be caused to pivot in the opposite direction since this would provide an enlarged opening between the pivoted pusher and the pusher trailing behind it. It will also be appreciated that a plurality of operators could be engaged in loading a single conveyor. In such an instance, an elongated table or separate tables would be employed and the respective pushers would be caused to pivot at each loading location. The operators may load the conveyor trays alternately for maximum efficiency.

It will be understood that various other changes and modifications may be made in the construction described which provide the characteristics of this invention without departing from the spirit thereof, particularly as defined in the following claims.

That which is claimed is:

1. A construction for delivering articles to a conveyor of the type comprising a plurality of spaced-apart sections for receiving articles, said construction comprising a table situated above the path of movement of the conveyor, said table defining a discharge end with the conveyor moving beneath said discharge end, and pusher means movable over said table adapted to engage articles placed on the table for moving the articles to the discharge end of the table whereby the articles can be delivered to the conveyor, an endless track mounted on one side of said table, carriage means movable on said track and supporting said pusher means in cantilever fashion, and means for synchronizing the movements of said conveyor and said pusher means.

2. A construction in accordance with claim 1 wherein said endless track is formed from two laterally spaced-apart rail sections, and wherein opposite ends of said carriage means are confined by said rail sections whereby the carriage means and associated pusher means are rigidly balanced with respect to said table.

3. A construction in accordance with claim 1 including means attached to each of said trays for engaging said carriage means when the trays move into the vicinity of the table, said engaging means operating to drive said carriages to thereby synchronize movement between the pusher means and the trays.

4. A construction for delivering articles to a conveyor of the type comprising a plurality of spaced-apart sections for receiving articles, said construction comprising a table situated above the path of movement of the conveyor, said table defining a discharge end with the conveyor moving beneath said discharge end, and pusher means movable over said table adapted to engage articles placed on the table for moving the articles to the discharge end of the table whereby the articles can be delivered to the conveyor, said pusher means comprising a portion which is pivotally mounted, and means for pivoting said pivotally mounted portion in the vicinity of said table whereby the opening between adjacent pusher means can be enlarged during loading of articles on the table to facilitate proper placement of the articles.

5. A construction in accordance with claim 4 wherein said pusher means are attached to said trays.

6. A construction in accordance with claim 4 including an endless track mounted on one side of said table, and carriage means movable on said track, said carriage means supporting said pusher means in cantilever fashion.

7. A construction for delivering articles to a conveyor of the type comprising a plurality of spaced-apart sections for receiving articles, said construction comprising a table situated above the path of movement of the conveyor, said table defining a discharge end with the conveyor moving beneath said discharge end, and pusher means movable over said table adapted to engage articles placed on the table for moving the articles to the discharge end of the table whereby the articles can be delivered to the conveyor, said pusher means comprising a pivotally mounted portion extending toward the loading side of said table, and means associated with said table for engaging said pivotally mounted portion whereby the opening between adjacent pusher means can be enlarged to facilitate loading of articles onto the table.

8. A construction in accordance with claim 7 wherein said pusher means comprises a rigid portion and an intermediate hinge connection between said rigid portion and said pivotal portion, engaging means carried by said pivotal portion and means attached to the underside of said table for cooperating with said engaging means to provide for pivoting of said pivotal portion.

9. A construction in accordance with claim 8 wherein said engaging means comprise first and second roller means, the means attached to said table comprising track means for engagement with the roller means, said track means causing said first roller means to impart pivoting movement to said pivotal portion, and said track means causing said second roller means to restore said pivotal portion.

10. A construction is accordance with claim 7 including an endless track mounted on one side of said table, carriage means movable on said track and supporting said pusher means in cantilever fashion, and means for synchronizing the movements of said conveyor and said pusher means.

11. A construction in accordance with claim 10 wherein said pusher means are pivotally attached to said carriage, a roller attached to said table for engaging said pusher means to impart pivotal action thereto, and means for restoring said pusher means when the pusher means is disengaged with said roller.

12. A construction in accordance with claim 11 including pins attached to each tray, said pins extending to a position for engagement with said carriages when a tray moves into the vicinity of said table for thereby automatically synchronizing movement between the trays and the pusher means.

13. A construction for delivering articles to a conveyor of the type comprising a plurality of spaced-apart sections for receiving articles, said construction comprising a table situated above the path of movement of the conveyor, said table defining a discharge end with the conveyor moving beneath said discharge end, and a plurality of pusher means movable over said table and adapted to engage articles placed on the table for moving the articles to the discharge end of the table whereby the articles can be delivered to the conveyor, said conveyor sections each defiining a trailing edge and including means for operatively attaching individual pusher means adjacent the trailing edge of respective conveyor sections whereby the pusher means and conveyor sections move in unison, each of said pusher means being maintained in vertical spaced-apart relationship with respect to the conveyor sections whereby the respective pusher means and tray sections move adjacent the table on opposite sides thereof.

14. A construction in accordance with claim 13 wherein said pusher means are mounted on a post which is attached to an individual conveyor section at an intermediate point along said trailing edge, and wherein said table is divided to provide an opening for passage of the posts of the respective pusher means as the conveyor sections and pusher means move past the table.

References Cited

UNITED STATES PATENTS 2,582,335   1/1952   Johanning _____ 198—173
2,828,851   4/1958   Thomas _____ 198—173

EVON C. BLUNK, *Primary Examiner.*

A. C. HODGSON, *Assistant Examiner.*